United States Patent [19]
Richter et al.

[11] Patent Number: 5,193,788
[45] Date of Patent: Mar. 16, 1993

[54] DAMPING BEARING ASSEMBLY

[75] Inventors: Matthias Richter, Inning; Mathias Gugsch, Munich; Robert Gresslinger, Wurmmannsquick, all of Fed. Rep. of Germany

[73] Assignee: Metzeler Gimetall AG, Munich, Fed. Rep. of Germany

[21] Appl. No.: 845,728

[22] Filed: Mar. 4, 1992

[30] Foreign Application Priority Data
Mar. 4, 1991 [DE] Fed. Rep. of Germany ....... 4106838

[51] Int. Cl.$^5$ ............................................. F16F 13/00
[52] U.S. Cl. ...................... 267/227; 267/30; 267/31; 267/148; 267/152; 267/158; 267/122; 267/149; 267/164; 267/165; 267/140.3; 267/140.11; 267/140.13
[58] Field of Search ............... 267/140.1 R, 140.1 A, 267/148, 149, 227, 158–165, 140.3, 122, 121, 217, 219, 218, 221, 23, 24, 30, 31, 32, 259, 35, 36.1, 151, 152, 140.5, 140.4; 248/562, 636, 638, 621, 634

[56] References Cited
U.S. PATENT DOCUMENTS

| | | | |
|---|---|---|---|
| 4,832,320 | 5/1989 | Scower et al. | 267/227 |
| 4,942,075 | 7/1990 | Hartel et al. | 267/148 X |
| 4,974,820 | 12/1990 | Nakanishi | 267/122 |
| 5,088,580 | 2/1992 | Grothe et al. | 267/140.1 A |

Primary Examiner—Douglas C. Butler
Attorney, Agent, or Firm—Herbert L. Lerner; Laurence A. Greenberg

[57] ABSTRACT

A damping bearing assembly, in particular a motor bearing for the vibration-insulated mounting of engines in motor vehicles, comprising an approximately annular spring body of fibrous composite materials, the spring body including a coil form of artificial resin impregnated fibers wound in several layers, force introducing elements clamping the coil form on mutually opposite sides, a working chamber for additional hydraulic damping disposed inside the spring body between the force-introducing elements, the working chamber being formed of elastically deformable material having a low degree of stiffness in an operating direction and a high degree of volume stiffness, a conduit hydraulically communicating with the work chamber and a compensating chamber hydraulically communicating with the conduit.

14 Claims, 3 Drawing Sheets

DAMPING BEARING ASSEMBLY

The invention relates to a damping bearing assembly, in particular for the vibration-insulating mounting of engines in motor vehicles, with an approximately annular spring body of fibrous composite materials which includes a coil form with artificial resin-impregnated fibers wound in several layers and which is clamped on two opposite sides by means of force-introducing elements.

Engines and transmissions in motor vehicles are conventionally mounted with rubber-metal elements which fix the engine in the vehicle. The support and mounting function must be fulfilled not only under static loads and under additional loads due to the drive torques, but also under extreme loads in the case of a crash. Furthermore, engine bearings must fulfill a number of dynamic and acoustic functions which lead to partly contradictory requirements in terms of component structure and which also lead to less than optimal compromises.

That basic conflict between the objects results from the different requirements, besides satisfying the mounting function there is also the object of optimizing vibration comfort and vehicle acoustics. While vibration comfort calls for a stiff, strongly damped connection between the engine and the vehicle, avoiding acoustical transmission advantageously requires strong insulation, i.e. a low grade of stiffness with little damping. This conflict of objects is further intensified with increasing operational temperatures of engine bearings in connection with partly or fully encased engines. The presently mostly used natural rubbers which are acoustically very favorable quite quickly reach their limit of effectiveness, the overall rigidity decreases, appearances of setting increase substantially and vibration tuning is no longer stable in the long term.

The foregoing problems can only be escaped from with an increased separation of functions as it has been realized to an essential degree in the context of hydraulically damping engine bearings, for example. In that mounting type, the damping which is required for improving the vibration comfort in a limited frequency range is no longer effected with rubber in a wide range, but instead in a narrow range —mostly in the range between 5 and 20 Hz—by means of vibratory fluid systems, which determine the damping and quenching properties of the bearing. However, in this type of bearing the load-bearing element also is a rubber spring, the dynamic behavior and static settling behavior of which depends on the ambient temperature. Additionally, the volume stiffness which is essential in terms of the dynamic behavior of the bearing cannot be adjusted independently of the static stiffness of the load bearing strength of the carrier spring in the three spatial dimensions.

A solution for the problems associated with mounting by means of rubber materials can be attained, however, with the above-described spring body as it is known, for instance, from DE 39 08 474 A1. Such a spring body takes over the support function and it determines essentially the elastic properties of the bearing, whereby force-introducing elements in the form of metallic clips, which are clamped from the core body through elastic rubber layers and which surround the core body at least partly, ensure a gentle, large- surface force introduction.

While such a bearing provides good basic damping, it has inferior acoustic characteristics due to its relatively high degree of stiffness, i.e. oscillations in the acoustic range are eliminated only to a small extent.

It is accordingly an object of the invention to provide a damping bearing assembly, which overcomes the hereinaforementioned disadvantages of the heretofore-known devices of this general type and which makes optimal acoustic decoupling possible as well, so that the bearing largely fulfills all of the requirements listed at the outset.

With the foregoing and other objects in view there is provided, in accordance with the invention, a damping bearing assembly, in particular a motor bearing for the vibration-insulated mounting of engines in motor vehicles, comprising an approximately annular spring body of fibrous composite materials, the spring body including a coil form of artificial resin impregnated fibers wound in several layers, force introducing elements clamping the coil form on mutually opposite sides, a working chamber for additional hydraulic damping disposed inside the spring body between the force-introducing elements, the working chamber being formed of elastically deformable material having a low degree of stiffness in an operating direction and a high degree of volume stiffness, a conduit hydraulically communicating with the working chamber and a compensating chamber hydraulically communicating with the conduit.

In accordance with an additional feature of the invention, the working chamber is formed of a pressure-stable bellows.

The object of the invention is thus solved in that, for the purpose of additional hydraulic damping, a work chamber is disposed inside the spring body between the force-introducing elements. The work chamber is filled with a fluid. It is formed of an elastically deformable material of small stiffness in the operating direction, yet great volume stiffness. The working chamber communicates with a compensating chamber via a conduit.

An additional hydraulically acting working chamber allows for the adjustment of the dynamic stiffness of the working chamber independently of the stiffness of the carrier spring.

In accordance with an added feature of the invention, the conduit is formed of a connecting line with a defined length and diameter, the compensating chamber being disposed outside the supporting spring body and the conduit hydraulically connecting the compensating chamber and the working chamber.

It is thereby especially advantageous when the compensating chamber has approximately the same structure and behavioral data as the working chamber. The use of a compensating chamber which is identical to the working chamber in terms of its shape and/or its characteristic stiffness diagram, i.e. a bellows which is identical with the working chamber at least in terms of its characteristic curve, helps avoid substantial shifting of the characteristic curve of the dynamic stiffness of the bearing due to static load changes.

Accordingly, in accordance with a further feature of the invention, the working chamber has a given defined structure and given characteristic operating data, the compensating chamber having substantially identical structure and characteristic operating data as compared to the working chamber.

In accordance with yet another feature of the invention, there is also provided a main support element for supporting an aggregate on the bearing disposed in between the compensating chamber and the working chamber, the compensating chamber and the working chamber being disposed coaxially with one another and mirror-symmetrically with respect to one another, the conduit extending through one of the force-introducing elements.

It is thus possible for the compensation chamber to be disposed in the same axis as the working chamber on the other side of the main support element in mirror symmetry with the working chamber and for it to communicate with the working chamber via a conduit which extends through a force-introducing element.

In accordance with yet an additional feature of the invention, the bearing includes an engine support flange attached to the bearing between the working chamber and the compensating chamber, and wherein the compensating chamber is disposed on top of the engine support flange and coaxially with the working chamber, and wherein the force-introducing introducing elements include upper and lower elements, the conduit extending through the upper element.

It is thus also possible that the compensation chamber is disposed in the same axis as the working chamber on the upper side of a motor bearing flange and that it communicates with the working chamber through a conduit extending through the upper force-introducing element.

In accordance with yet an added feature of the invention, the spring body is a first spring body, and including a second spring body disposed coaxially with the first spring body and having a working chamber, a main support element disposed between the first and second spring bodies, force-introducing elements disposed on the spring bodies in the vicinity of the main support element, the spring bodies being disposed in mirror-image orientation with respect to one another, and a communication conduit hydraulically connecting the first and working chambers of the spring bodies, and the communication conduit extending through the two force-introducing elements at the main support element.

It is a particularly advantageous embodiment of the invention when two spring bodies with a working chamber each are disposed and oppositely connected on the respective sides of the main support element in mirror image and they communicate with one another via a conduit extending through the two force-introducing elements at the main support element. This leads to a pumping effect in both operating directions, so that cavitations can be avoided.

In accordance with again another feature of the invention, the bearing includes a cylindrical bumper of elastic material disposed in the working chamber and originating from a face end of the working chamber.

In accordance with again an additional feature of the invention, the bellows has a given diameter and the bearing includes a transversely extending plate of a diameter smaller than the given diameter disposed in the working chamber at a given distance from an end face thereof, the plate being means for acting as an inertia force-effective plunger.

In accordance with again an added feature of the invention, the bearing includes a cylindrical bumper of elastic material disposed in the working chamber and originating from a face end of the working chamber, and wherein the plunger is disposed on or in the area of the end face of the bumper.

In accordance with again a further feature of the invention, the spring body is in the form of two concentric coil forms and including a layer of a material different from that of the coil forms disposed between the concentric coil forms.

In accordance with again additional feature of the invention, the layer is formed of rubber being vulcanized in between the two coil forms.

In accordance with a concomitant feature of the invention, the layer is in the form of sliding gliding foils glued to the respective coil forms, whereby the gliding foils freely glide on each other.

It is thus seen to be useful when a cylindrical stop cushion of elastic material is disposed in the working chamber starting out from the front end.

Additionally, a transversely directed rail may be disposed in the working chamber, for example at the end or the forward region of the stop cushion which, as an inertia force- effective plunger provides for a defined stiffness reduction in the acoustic range.

Other features which are considered as characteristic for the invention are set forth in the appended claims.

Although the invention is illustrated and described herein as embodied in a damping bearing assembly, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiments when read in connection with the accompanying drawings.

DESCRIPTION OF THE PREFERRED EMBODIMENTS

Figure 1:
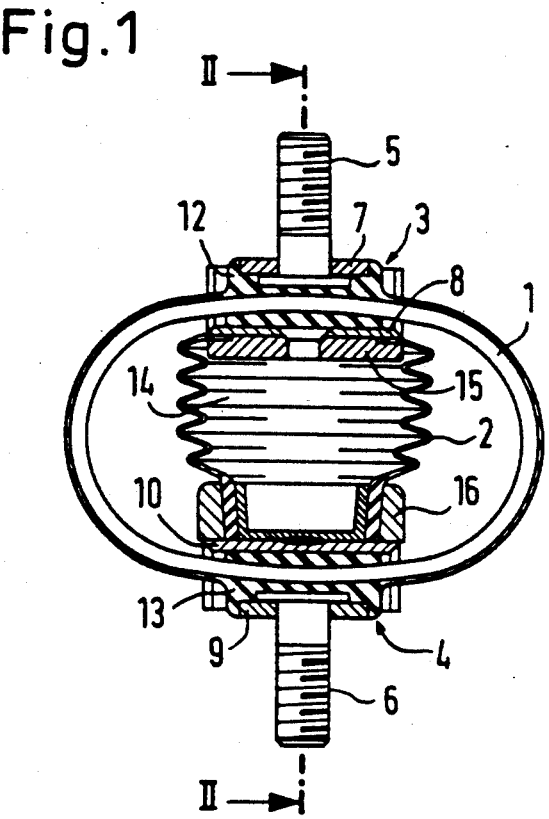
FIG. 1 is an elevational, cross-sectional view of the basic damping bearing assembly of the invention, as cut along the line I—I of FIG. 2.

Referring now to the figures of the drawing in detail and first, particularly, to FIG. 1 thereof, there is seen an bearing assembly which essentially includes an oval spring body of a wound body or coil form 1 and an inner, fluid-filled bellows 2. The coil form 1 of the illustrated embodiment has an approximately oval shape with straight central parts and semi-circular lateral parts. Any other closed geometric shape, however, is possible as well, as for example an ellipse or a circle.

The coil body 1 is formed of several layers of fibers impregnated with artificial resin plastic. The fibers are chiefly wound around transversely as seen in the direction of stress. It is also possible that individual layers are wound at mutually diverging angles.

Reinforcing fibers are mostly glass fibers, or they can be carbon fibers or Aramite, while hardenable matrix materials are essentially duroplastics or thermoplastics, such as polyether-etherketon (PEFK).

The fully wound, impregnated and hardened coil body 1 is then fixed at mutually opposite sides to corresponding force-transmitting or force-introducing elements 3 and 4 at the corresponding mounting locations 5 for the engine and 6 for the automobile body. The force-introducing elements 3 and 4 of the illustrated embodiment are bars in the form of two U-shaped cover plates 7 and 8, or 9 and 10 respectively, which are laterally clamped against each other through bolts 11, and which embrace the coil form 1 along the longitudinal sides. Elastic intermediate layers 12 and 13 of rubber are respectively disposed between the plates 7-8 and 9-10. The rubber layers 12 and 13 can be vulcanized in between the plates 7-8 and 9-10; it is also possible, however, to glue them there or simply clamp them in between.

Inside the spring body 1, between the two inner U-shaped plates 8 and 10, there is disposed a working chamber 14 which is defined by a surrounding bellows 2; the working chamber 14 has a low degree of stiffness in the operating direction, yet great volume stiffness, i.e. the bellows 2 is pressure-stable in the sense that it cannot be expanded outwardly in terms of its diameter. The bellows 2 is fluid-tightly clamped against the plate 8 at the upper end by means of a plate 15 and against the plate 10 by means of a plate 16 at its lower end. The bellows 2 itself is filled with a hydraulic fluid.

Figure 2:
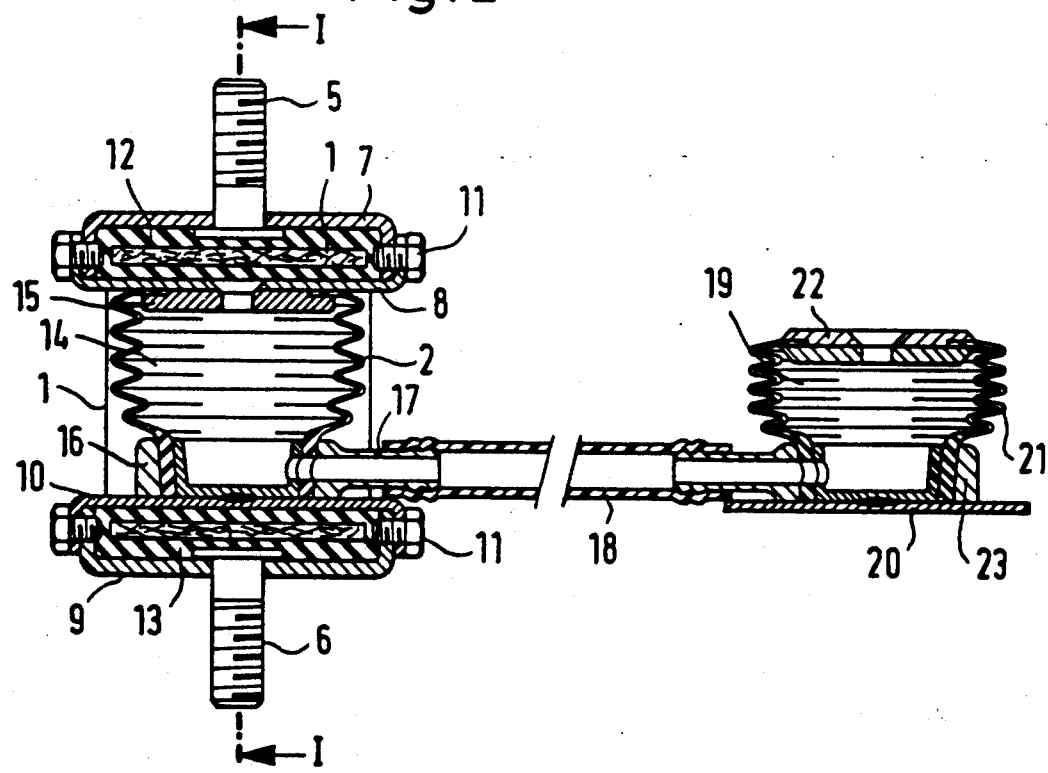
FIG. 2 is a cross-sectional view of the bearing along the section line II—II of FIG. 1, with a separately disposed compensating chamber.

As can be seen in FIG. 2, the lower plate 16 has a lateral outlet 17 which, through a connecting line 18 of defined length and defined diameter, leads to an external compensating chamber 19. The compensating chamber 19 is supported on a separate plate 20 outside the bearing configuration proper and it has in principle the same structure as the working chamber 14, i.e. it includes a similar bellows 21, which is closed off at its upper free end by means of a plate 22 and is clamped on the plate 20 at its lower end in a clamping ring 23.

After the assembly of such a bearing, the spring body 1 first assumes the actual support function, i.e. it takes over the static load and it essentially determines the elastic properties of the bearing. Individual intermediate layers of rubber or sliding foils which are laminated in the spring body 1 make it possible to attain wide-range basic damping, i.e. damping which is effective over a wide frequency range. The hydraulic damping device formed by the bellows 2 with a working chamber 14 disposed on the inside of the bearing between the two force-introducing points 3 and 4, which are formed of an elastically deformable material of a low degree of stiffness in the operating direction yet great volume stiffness, thus allows for the dynamic stiffness of the working chamber to be adjusted independently of the stiffness of the support spring.

This makes is possible to particularly influence the acoustic behavior of the bearing in a positive way.

Figure 3:
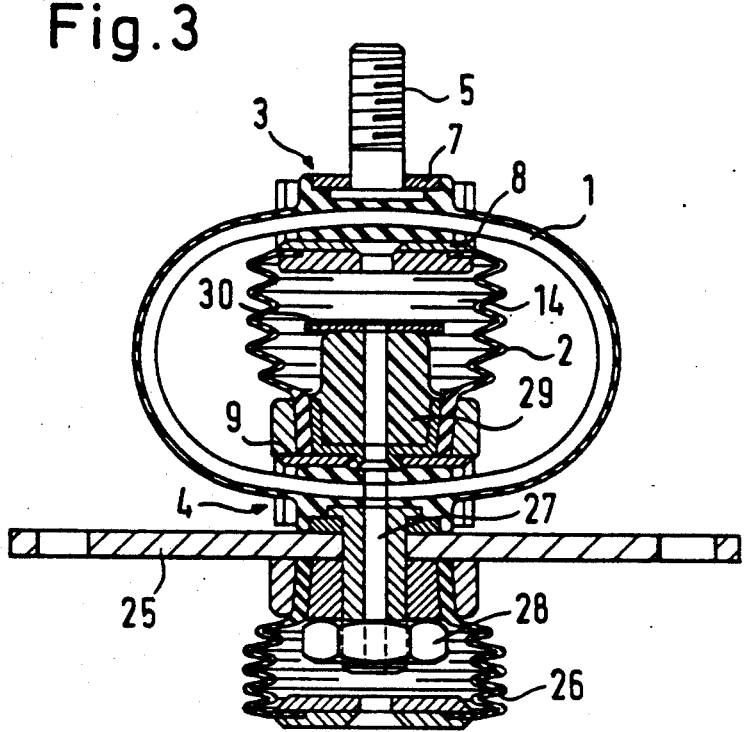
FIG. 3 is a view similar to FIG. 1 of an embodiment of the bearing with the compensating chamber disposed opposite a mounting flange.

FIG. 3 illustrates a further embodiment of the bearing assembly according to the present invention. Above a vehicle body flange 25 there is provided in a similar manner a spring body 1 with a bellows 2. A compensating chamber with a bellows 26 of equal dimensions and structure as the bellows 2 is mounted coaxially with the bellows 2 below the body flange 25.

The two bellows 2 and 26 thereby communicate through a conduit 27 extending through the lower force-introducing element 4 and through a mounting bolt 28.

In addition, a cylindrical bumper 29 is provided inside the bellows 2. The bumper 29 can—as illustrated in the drawing—be provided at its face, or inside the upper region of the bumper 29, with a flat plate 30 of greater diameter as an inertia force plunger, which allows for defined stiffness reduction in the acoustic range. Inertia force plunger, in this context, is defined as a plunger which is effective in absorbing intertial forces.

Figure 4:
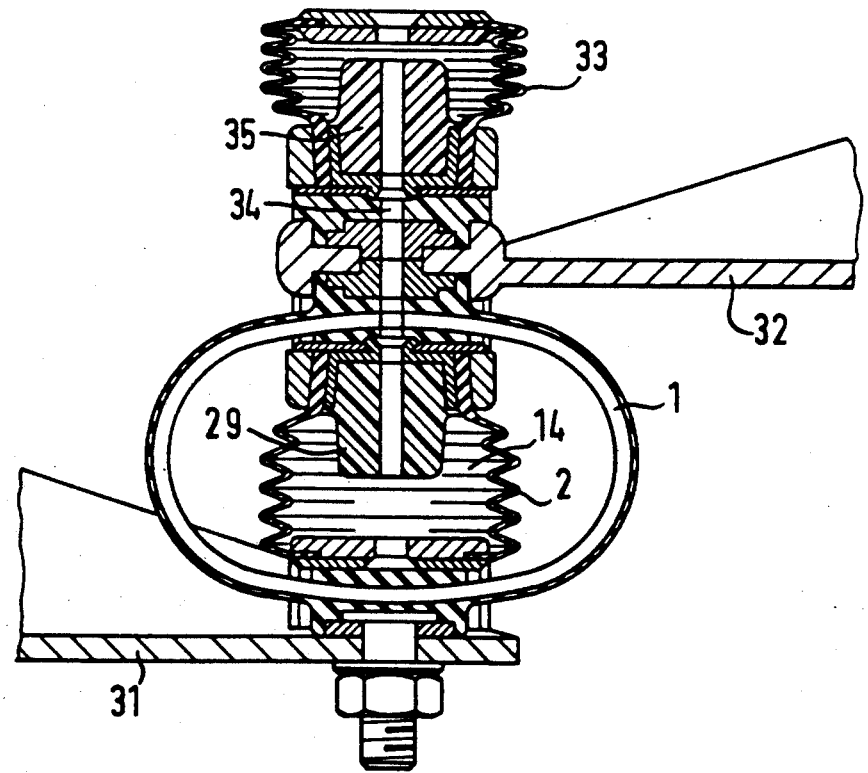
FIG. 4 is a longitudinal sectional view through a bearing with a compensating chamber above a carrier arm support.

In the embodiment illustrated in FIG. 4, the spring body 1 is clamped between a body support arm 31 and an engine support arm 32. A bellows 33 of the compensating chamber is disposed above the engine support arm 32 and communicates with the working chamber 14 in the bellows 2 via a conduit 34.

Additionally, a bumper 35 is provided inside the bellows 34, in order to provide for equal volume proportions within the bellows 2 of the working chamber and the bellows 33 of the compensating chamber.

Figure 5:
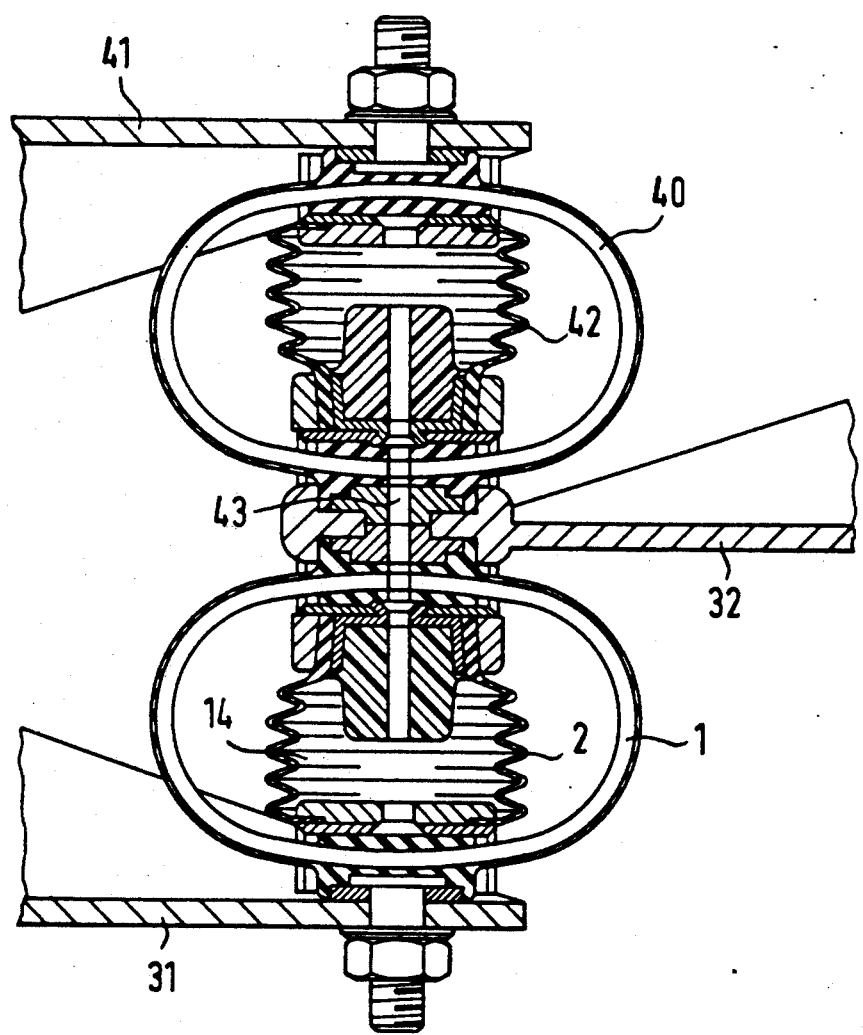
FIG. 5 is a longitudinal sectional view of a pre-stressable, double-acting bearing with two mirror-symmetrically disposed spring bodies.

An expanded embodiment is illustrated in FIG. 5 in which above and below the engine support arm 32 spring bodies 1 and 40 are disposed which respectively rest against body support arms 31 and 41. The two spring bodies 1 and 40 are identically constructed with their respective bellows 2 and 42, but they are arranged in mirror symmetry with respect to one another. Such a configuration and structure leads to a pumping effect in the two operating directions which, particularly, avoids cavitations.

The above-described configurations make possible specific damping and quenching effects in a narrow frequency range, independently of the pre-load or bias as in a classical hydro-bearing, yet without the disadvantages described at the outset with regard to temperature resistance and setting occurrences. Furthermore, the possibility is provided to set the dynamic characteristics independently of the required static characteristics in the three spatial dimensions.

We claim:

1. Damping bearing assembly, comprising an approximately annular spring body of fibrous composite materials, said spring body including a coil form of artificial resin impregnated fibers wound in several layers, force introducing elements clamping said coil form on mutually opposite sides, a working chamber for additional hydraulic damping disposed inside said spring body between said force-introducing elements, said working chamber being formed of elastically deformable material having a low degree of stiffness in an operating direction of the bearing assembly and a high degree of volume stiffness, a conduit hydraulically communicating with said working chamber and a compensating chamber hydraulically communicating with said conduit.

2. Bearing assembly according to claim 1, wherein said working chamber is formed of a pressure-stable bellows.

3. Bearing assembly according to claim 1, wherein said conduit is formed of a connecting line with a defined length and diameter, said compensating chamber being disposed outside said spring body and said conduit hydraulically connecting said compensating chamber and said working chamber.

4. Bearing assembly according to claim 3, wherein said working chamber has a given defined structure and given characteristic operating data, said compensating chamber having substantially identical structure and characteristic operating data as compared to said working chamber.

5. Bearing assembly according to claim 1, including a main support element for supporting an aggregate on the bearing disposed in between said compensating chamber and said working chamber, said compensating chamber and said working chamber being disposed coaxially with one another and mirror-symmetrically with respect to one another, said conduit extending between said chambers through one of said force-introducing elements.

6. Bearing assembly according to claim 1, including an engine support flange attached to the bearing between said working chamber and said compensating chamber, and wherein said compensating chamber is disposed on top of said engine support flange and coaxially with said working chamber, and wherein said force-introducing elements include upper and lower elements, said conduit extending through said upper element.

7. Bearing assembly according to claim 1, wherein said spring body is a first spring body and said working chamber is a first working chamber, including a second spring body disposed coaxially with said first spring body and having a second working chamber, a main support element disposed between said first and second spring bodies, force-introducing elements disposed on said spring bodies in a vicinity of said main support element, said spring bodies being disposed in mirror-image orientation with respect to one another, and a communication conduit hydraulically connecting said first and second working chambers of said spring bodies, and said communication conduit extending through said two force-introducing elements at said main support element.

8. Bearing assembly according to claim 1, including a cylindrical bumper of elastic material disposed in said working chamber and originating from a face end of said working chamber.

9. Bearing assembly according to claim 2, wherein said bellows has a given diameter and including a transversely extending plate of a diameter smaller than said given diameter disposed in said working chamber at a given distance from an end face thereof, said plate being means for acting as an inertia force plunger.

10. Bearing assembly according to claim 9, including a cylindrical bumper of elastic material disposed in said working chamber and originating from an end face of said working chamber, and wherein said plunger is disposed on or in an area of the end face of said bumper.

11. Bearing assembly according to claim 1, wherein said spring body is in a form of two concentric coil forms and including a layer of a material different from that of said coil forms disposed between said concentric coil forms.

12. Bearing assembly according to claim 11, wherein said layer is formed of rubber being vulcanized in between said two coil forms.

13. Bearing assembly according to claim 11, wherein said layer is in a form of gliding foils glued to said respective coil forms, said gliding foils freely gliding on one another.

14. Engine mount for a vibration-insulated mounting of engines in motor vehicles, comprising an approximately annular spring body of fibrous composite materials, said spring body including a coil form of artificial resin-impregnated fibers wound in several layers, force-introducing elements clamping said coil form on two mutually opposite sides, a working chamber for additional hydraulic damping disposed inside said spring body between said force-introducing elements, said working chamber being defined by a body of elastically deformable material having a low degree of stiffness in an operating direction of the engine mount and having a high degree of volume stiffness, a conduit hydraulically communicating with said working chamber, and a compensating chamber hydraulically communicating with said conduit.

* * * * *